(12) United States Patent
Vogt

(10) Patent No.: US 9,381,796 B2
(45) Date of Patent: Jul. 5, 2016

(54) SPLIT HARD TOP CONVERTIBLE FOR MOTORIZED PASSENGER VEHICLE

(71) Applicant: Kurt Paul Vogt, San Diego, CA (US)

(72) Inventor: Kurt Paul Vogt, San Diego, CA (US)

(73) Assignee: Kurt P. Vogt, San Diego, CA (US)

( * ) Notice: Subject to any disclaimer, the term of this patent is extended or adjusted under 35 U.S.C. 154(b) by 0 days.

(21) Appl. No.: 14/539,982

(22) Filed: Nov. 12, 2014

(65) Prior Publication Data

US 2015/0076855 A1   Mar. 19, 2015

(51) Int. Cl.
*B60J 7/00* (2006.01)
*B60J 7/16* (2006.01)

(52) U.S. Cl.
CPC .................. *B60J 7/1678* (2013.01)

(58) Field of Classification Search
CPC ............ A63C 9/08564; B60N 2/2358; E05Y 2900/51; G11B 15/10; A62B 1/14; C09D 151/08; C09D 175/04; G01C 21/367; B60C 13/00; B60C 17/0009
USPC ................................ 296/107.17, 107.15, 210
See application file for complete search history.

(56) References Cited

U.S. PATENT DOCUMENTS

| 4,861,092 | A | * | 8/1989 | Bogard | B60J 7/141 296/100.09 |
|---|---|---|---|---|---|
| 5,544,934 | A | * | 8/1996 | Murkett | B60J 7/047 296/102 |
| 5,803,534 | A | * | 9/1998 | Murkett | B60J 7/04 296/215 |
| 6,010,178 | A | * | 1/2000 | Hahn | B60J 7/203 296/107.08 |
| 6,039,383 | A | * | 3/2000 | Jambor | B60J 1/1823 296/107.07 |
| 6,209,945 | B1 | * | 4/2001 | Aydt | B60J 7/1265 296/107.15 |
| 6,336,673 | B1 | * | 1/2002 | Rothe | B60J 7/146 296/107.17 |
| 6,390,531 | B1 | * | 5/2002 | Schutt | B60J 7/0053 296/107.13 |
| 6,467,832 | B2 | * | 10/2002 | Schutt | B60J 7/207 296/107.08 |
| 6,478,362 | B2 | * | 11/2002 | Obendiek | B60J 7/145 296/108 |
| 6,572,175 | B2 | * | 6/2003 | Schutt | B60J 7/028 296/107.13 |
| 6,592,169 | B2 | * | 7/2003 | Obendiek | B60J 7/145 296/107.07 |
| 6,666,495 | B2 | * | 12/2003 | Nania | B60J 7/145 296/107.08 |
| 6,695,386 | B1 | * | 2/2004 | Willard | B60J 7/145 296/107.01 |
| 6,761,392 | B2 | * | 7/2004 | Hasselgruber | B60J 7/145 296/107.17 |
| 6,796,597 | B2 | * | 9/2004 | Mac Farland | B60J 7/146 296/107.15 |
| 6,830,282 | B2 | * | 12/2004 | Guillez | B60J 7/146 296/107.08 |

(Continued)

*Primary Examiner* — Kiran B Patel

(57) ABSTRACT

A two part electronically actuated moveable and removable rigid covering of the passenger compartment of a motorized vehicle which is split longitudinally, has a left and right surface, capable of independently assuming a plurality of positions relative to the body of the vehicle. This covering pivots laterally near the rear edge behind the occupant(s) riding position with the forward edge opening, closing and locking. It is designed in such a manor as to permit its entire assembly or parts of its subassembly to be readily physically disassociated from the body of the motorized vehicle. It is fabricated from advanced composite materials or polycarbonate which is formed or molded to the desired shape. Movement of each covering is provided by an electrical linear actuator which, through mechanical linkage, provides locking or unlocking and rotational movement of the covering surface in one linear actuator motion.

5 Claims, 14 Drawing Sheets

(56) References Cited

U.S. PATENT DOCUMENTS

| | | | | |
|---|---|---|---|---|
| 6,830,284 B2* | 12/2004 | Guillez | B60J 7/028 296/107.17 |
| 6,837,533 B2* | 1/2005 | Wojciech | B60J 7/146 296/107.17 |
| 6,857,687 B2* | 2/2005 | Bruder | B60J 7/146 296/108 |
| 6,866,324 B2* | 3/2005 | Neubrand | B60J 7/145 296/107.07 |
| 6,871,901 B2* | 3/2005 | Stenvers | B60J 7/145 296/107.17 |
| 6,976,725 B2* | 12/2005 | Guillez | B60J 7/145 296/107.17 |
| 7,000,973 B2* | 2/2006 | Guillez | B60J 7/208 296/107.08 |
| 7,004,531 B2* | 2/2006 | Obendiek | B60J 7/1252 296/107.06 |
| 7,100,963 B2* | 9/2006 | Queveau | B60J 7/145 296/108 |
| 7,108,310 B2* | 9/2006 | Guillez | B60J 7/145 296/107.17 |
| 7,182,389 B2* | 2/2007 | Bruder | B60J 7/146 296/108 |
| 7,198,318 B2* | 4/2007 | Dilluvio | B60J 7/145 296/107.08 |
| 7,287,801 B2* | 10/2007 | Harrison, III | B60J 7/1265 296/107.09 |
| 7,325,857 B2* | 2/2008 | Queveau | B60J 7/145 296/107.07 |
| 7,344,180 B2* | 3/2008 | Halbweiss | B60J 1/1823 296/107.01 |
| 7,364,217 B2* | 4/2008 | Obendiek | B60J 7/146 296/107.17 |
| 7,374,226 B2* | 5/2008 | Obendiek | B60J 7/146 296/107.17 |
| 7,429,071 B2* | 9/2008 | Meinert | B60J 1/1823 296/107.07 |
| 7,494,178 B2* | 2/2009 | Nygaard | B60R 21/13 180/274 |
| 7,571,951 B2* | 8/2009 | Kreiling | B60J 7/201 296/107.09 |
| 7,597,380 B1* | 10/2009 | Adjwok | B60J 7/1855 296/107.08 |
| 7,669,912 B2* | 3/2010 | Brockhoff | B60J 7/0076 296/107.09 |
| 7,677,635 B2* | 3/2010 | Brockhoff | B60J 7/0076 296/107.09 |
| 7,686,377 B2* | 3/2010 | Brockhoff | B60J 7/205 296/107.08 |
| 7,708,333 B2* | 5/2010 | Kracht | B60J 7/201 296/107.08 |
| 7,712,817 B2* | 5/2010 | Meinert | B60J 7/145 296/107.07 |
| 7,766,413 B2* | 8/2010 | Dietl | B60J 7/1265 296/107.09 |
| 7,784,850 B2* | 8/2010 | Feussahrens | B60J 7/19 296/121 |
| 7,819,459 B2* | 10/2010 | Kinnanen | B60J 7/205 296/107.08 |
| 7,866,726 B2* | 1/2011 | Neubrand | B60J 7/146 296/107.17 |
| 7,896,423 B2* | 3/2011 | Wiechowski | B60J 1/1823 296/107.17 |
| 7,909,385 B2* | 3/2011 | Russke | B60J 7/148 296/107.07 |
| 8,066,317 B2* | 11/2011 | Fladung | B60J 7/1226 296/107.08 |
| 8,167,354 B2* | 5/2012 | Haberl | B60J 7/146 296/107.15 |
| 8,382,190 B2* | 2/2013 | Fallis, III | B60J 7/028 296/107.07 |
| 2001/0006297 A1* | 7/2001 | Dintner | B60J 7/146 296/107.17 |
| 2001/0019213 A1* | 9/2001 | Eberle | B60J 7/145 296/108 |
| 2002/0050727 A1* | 5/2002 | Hasselgruber | B60J 1/1823 296/107.17 |
| 2002/0105205 A1* | 8/2002 | Willard | B60J 7/19 296/107.07 |
| 2002/0125733 A1* | 9/2002 | Kinnanen | B60J 7/145 296/107.17 |
| 2003/0080580 A1* | 5/2003 | Obendiek | B60J 7/146 296/107.17 |
| 2003/0189356 A1* | 10/2003 | Hasselgruber | B60J 1/1823 296/107.17 |
| 2004/0174039 A1* | 9/2004 | Dilluvio | B60J 7/207 296/107.17 |
| 2004/0207232 A1* | 10/2004 | Neubrand | B60J 7/145 296/107.17 |
| 2007/0090664 A1* | 4/2007 | Wezyk | B60J 7/047 296/107.17 |
| 2007/0090665 A1* | 4/2007 | Wezyk | B60J 7/047 296/107.17 |
| 2008/0093880 A1* | 4/2008 | Westermann | B60J 7/145 296/107.17 |
| 2013/0038084 A1* | 2/2013 | Kinnanen | B60J 7/146 296/107.17 |
| 2013/0062913 A1* | 3/2013 | Engler | B60J 5/047 296/210 |

* cited by examiner

Front plan view in the closed position

FWD

Rear plan view in the closed position

CONVERTIBLE SPLIT HARD TOP (Optional)

Side plan view of the center support beam with the left and right covering surfaces in the open position

SPLIT HARD TOP CONVERTIBLE FOR MOTORIZED PASSENGER VEHICLE

CROSS REFERENCE TO RELATED APPLICATIONS

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

This device allows for a two part movable and removable rigid covering of the passenger compartment of a motorized vehicle. This covering allows for independent, left or right, capability of assuming a plurality of positions relative to the body of the vehicle. It is designed in such a manner as to permit its entire assembly or parts of it's subassembly to be readily physically disassociated from the body to form a passage, reduce the weight of the vehicle, change its appearance and alter its driving characteristics.

BRIEF SUMMERY OF THE INVENTION

The object of this invention was to create a two part electronically actuated moveable and removable rigid covering of the passenger compartment for any motorized vehicle having a permanent windshield and a means associated with the cab to prevent injury to the occupants from rollover or crush protection or similar device in the same vicinity. This two part movable rigid covering would be split longitudinally, having a left and right surface capable of independently assuming a plurality of positions relative to the body of the vehicle. The covering would pivot laterally near the rear edge behind the occupant(s) riding position with the forward edge opening, closing and locking.

To summarize this invention, this device allows for a two part movable and removable rigid covering of the passenger compartment of a motorized vehicle. This covering allows for independent, left or right, capability of assuming a plurality of positions relative to the body of the vehicle. It provides protection from the elements while the vehicle is utilized. Where no occupant entrance doors are present, it allows occupants access to enter or exit the vehicle from both sides simultaneously if desired. Where occupant entrance doors are present, it allows occupants easier access to enter and exit the vehicle from both sides simultaneously if desired. The left and right covering surfaces are independently electrically actuated by a linear actuator. The actuators, through mechanical linkage, provide locking or unlocking, and rotational movement of the covering surface in one linear actuator motion. The covering surface is pivoted laterally near the rear edge behind the occupant(s) riding position. The vehicle's means associated with the cab to prevent injury to the occupants from rollover or crush protection or similar device in the same vicinity provides the attachment point for the device that allows a turning or pivoting movement of the covering. The front of the covering surface is rotated up away from the windshield for the occupant(s) to enter or exit the vehicle when it is not in motion. The front of the covering surface is rotated down, aligned and locked to the windshield frame and center support when the vehicle is stored or in motion. It provides a weather tight seal between the windshield, windows, if so equipped, and longitudinal center support beam.

It is designed in such a manner as to permit its entire assembly or parts of it's subassembly to be readily physically disassociated from the body to form a passage, reduce the weight of the vehicle, change its appearance and alter its driving characteristics.

This design of a clear, translucent or opaque split rigid surface that is capable of assuming a plurality of positions relative to the body of the vehicle and can be easily removed provides many advantages.

Ease of entering or exiting a motorized vehicle especially for people with certain disabilities.

Increased functionality of the motor vehicle is achieved by its complete or partial removal from the motor vehicle body.

The occupant(s) must step over the side of the vehicle to enter or exit small motor vehicles which have no occupant entrance doors. For vehicles having no occupant entrance doors, a top covering would need to be opened and closed each time the occupant(s) enter and exit. No top covering would provide no protection from the elements. A cloth covering would wear out from excessive use and movement. A split hard covering which pivots laterally near the rear edge behind the occupant(s) riding position would allow the occupant(s) to independently or simultaneously enter or exit the motor vehicle. Simultaneous entry or exit of the motor vehicle could not be achieved if the split hard covering pivoted longitudinally at the center via a center support beam. Both split coverings could not be opened simultaneously due to mechanical interference above the center support beam caused by the three dimensional shape of the covering surface. This is especially critical for smaller vehicles which have a narrow body width requiring a narrow center support beam and left and right fulcrums for the rigid covering very close to the center line of the motor vehicle.

Another advantage of this design which pivots laterally near the rear edge behind the occupant(s) riding position is creating more head room and a less obstructed view. If the bulky hinge bracket assemblies were located longitudinally on the center support beam they would create a blind spot. They could also be dangerously close to an occupant's head during an accident.

Also, another advantage is that it could easily be incorporated as a standard feature or option on a currently produced vehicle with minimal changes. The only requirements are that it has a permanent windshield and a means associated with the cab to prevent injury to the occupants from rollover or crush protection or similar device in the same vicinity to provide the attachment point for the device that allows a turning or pivoting movement of the covering.

DETAILED DESCRIPTION OF THE INVENTION

The split hard top motor vehicle movable covering is composed of the following components: left internal electrical operating switch, right internal electrical operating switch, left covering surface with attached mechanical apparatuses, right covering surface with attached mechanical apparatuses, left linear actuator, right linear actuator and center support beam.

Figure 7:
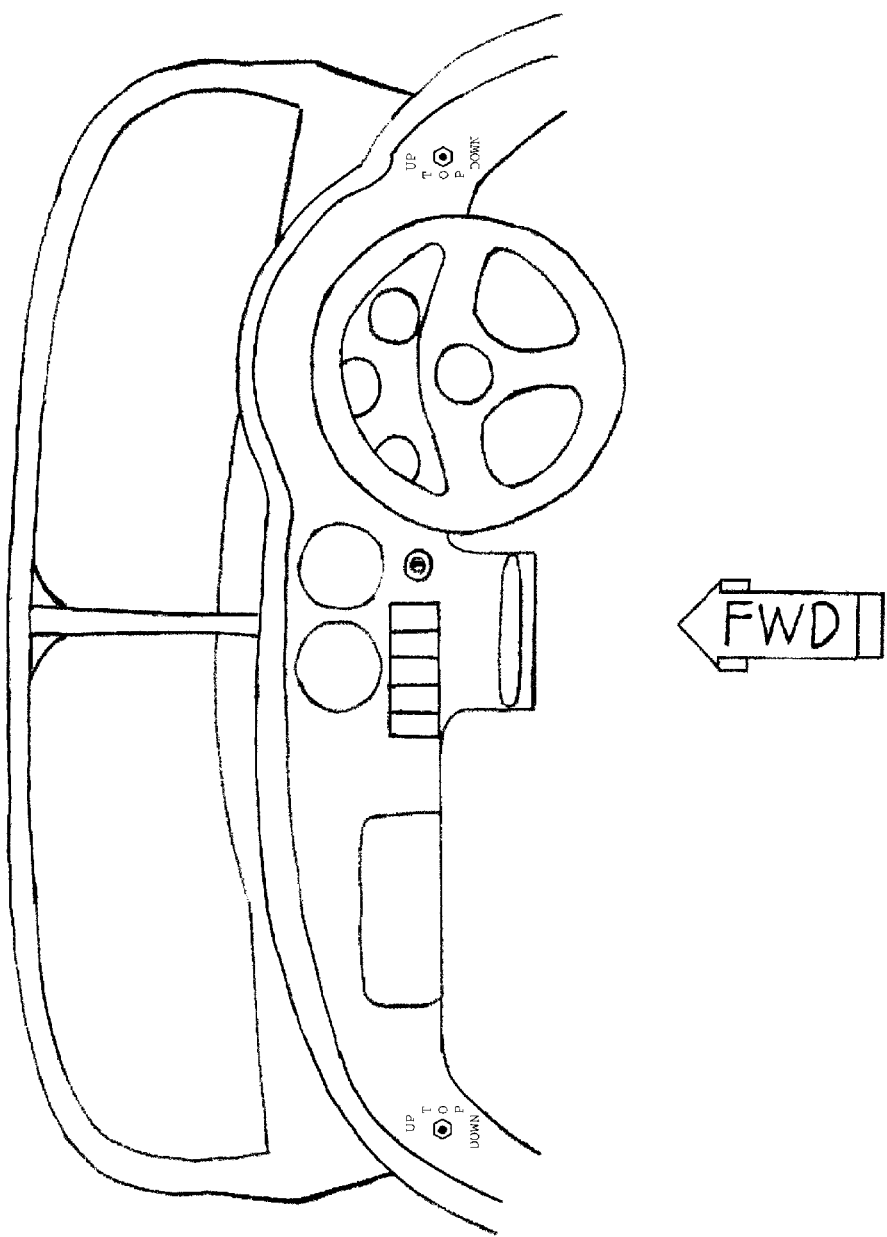
FIG. 7 is a front plan view of the left and right electrical control switches.

As depicted in FIG. 7, the left internal electrical operating switch is located on the extreme left side of the motorized vehicle's dash. It is a double pole double throw (On)-Off-(On) sealed toggle switch.

As depicted in FIG. 7, the right internal electrical operating switch is located on the extreme right side of the motorized vehicle's dash. It is a double pole double throw (On)-Off-(On) sealed toggle switch.

As depicted in FIG. 1 thru 4, the left covering surface extends longitudinally from the windshield frame to the rear edge of the occupant's compartment. It extends laterally from the vehicle's centerline to the left edge of the occupant's compartment and above the occupant's head. It is made from advanced composite materials or polycarbonate. Its optimum thickness is 0.250". It is formed or molded to the desired shape, frameless, clear, translucent or opaque. Attached to it are mechanical linkages for aligning, locking, unlocking, hinges and hinge supports.

As depicted in FIG. 1 thru 4, the right covering surface extends longitudinally from the windshield frame to the rear edge of the occupant's compartment. It extends laterally from the vehicle's centerline to the right edge of the occupant's compartment and above the occupant's head. It is made from advanced composite materials or polycarbonate. Its optimum thickness is 0.250". It is formed or molded to the desired shape, frameless, clear, translucent or opaque. Attached to it are mechanical linkages for aligning, locking, unlocking, hinges and hinge supports.

Figure 8:
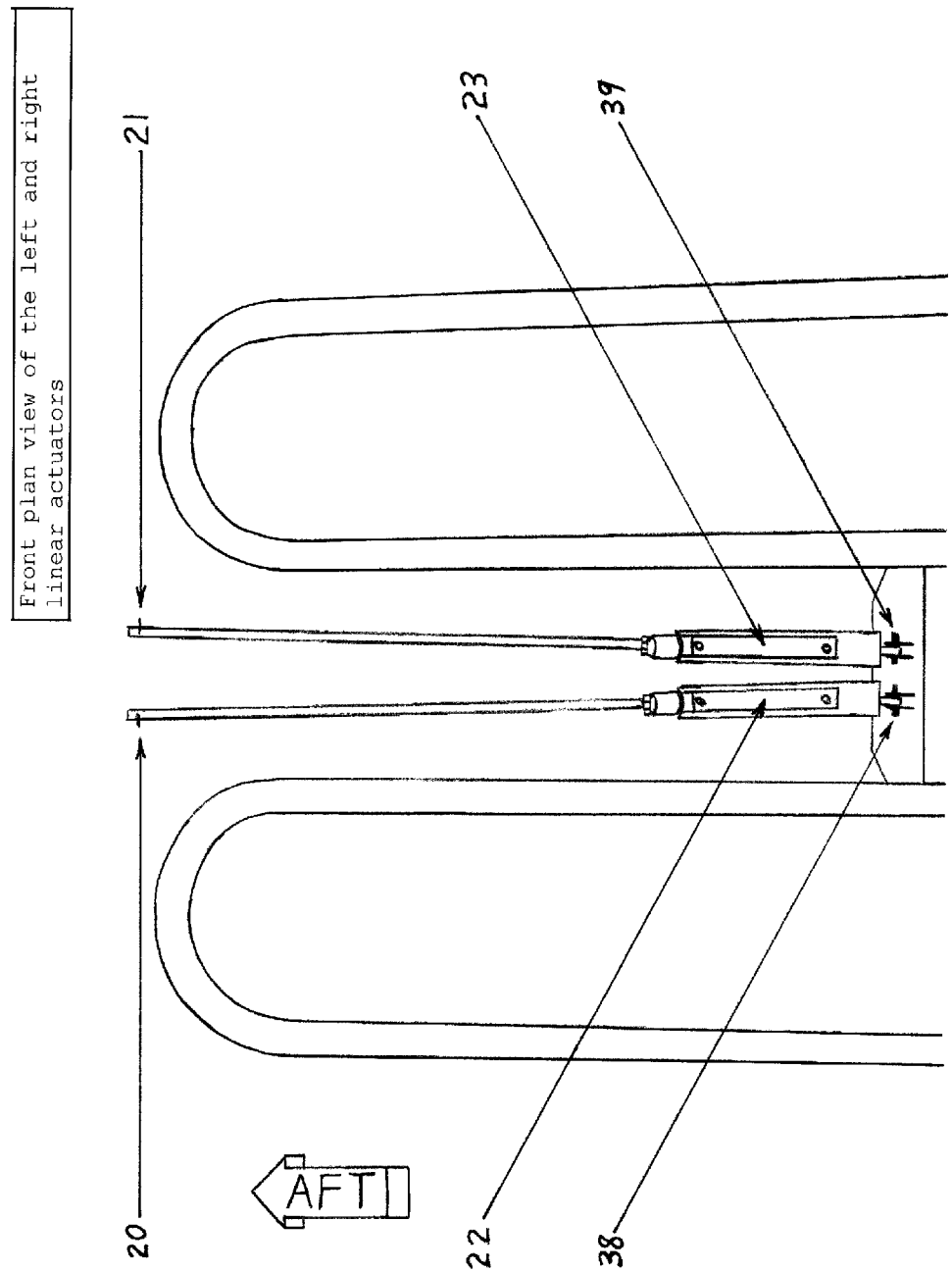
FIG. 8 is a front plan view of the left and right linear actuators.

As depicted in FIG. 8, the left linear actuator is positioned vertically to the right and rear of the left occupant's seat with the stationary end of the actuator mounted near the floor. The actuator electrically raises, lowers, locks and unlocks the left passenger compartment covering surface. It is 12VDC and has internal preset limit switches. Both ends of the actuator are secured by quick release devices. The electrical connection is also designed for quick disconnect.

As depicted in FIG. 8, the right linear actuator is positioned vertically to the left and rear of the right occupant's seat with the stationary end of the actuator mounted near the floor. The actuator electrically raises, lowers, locks and unlocks the right passenger compartment covering surface. It is 12VDC and has internal preset limit switches. Both ends of the actuator are secured by quick release devices. The electrical connection is also designed for quick disconnect.

Figure 5:
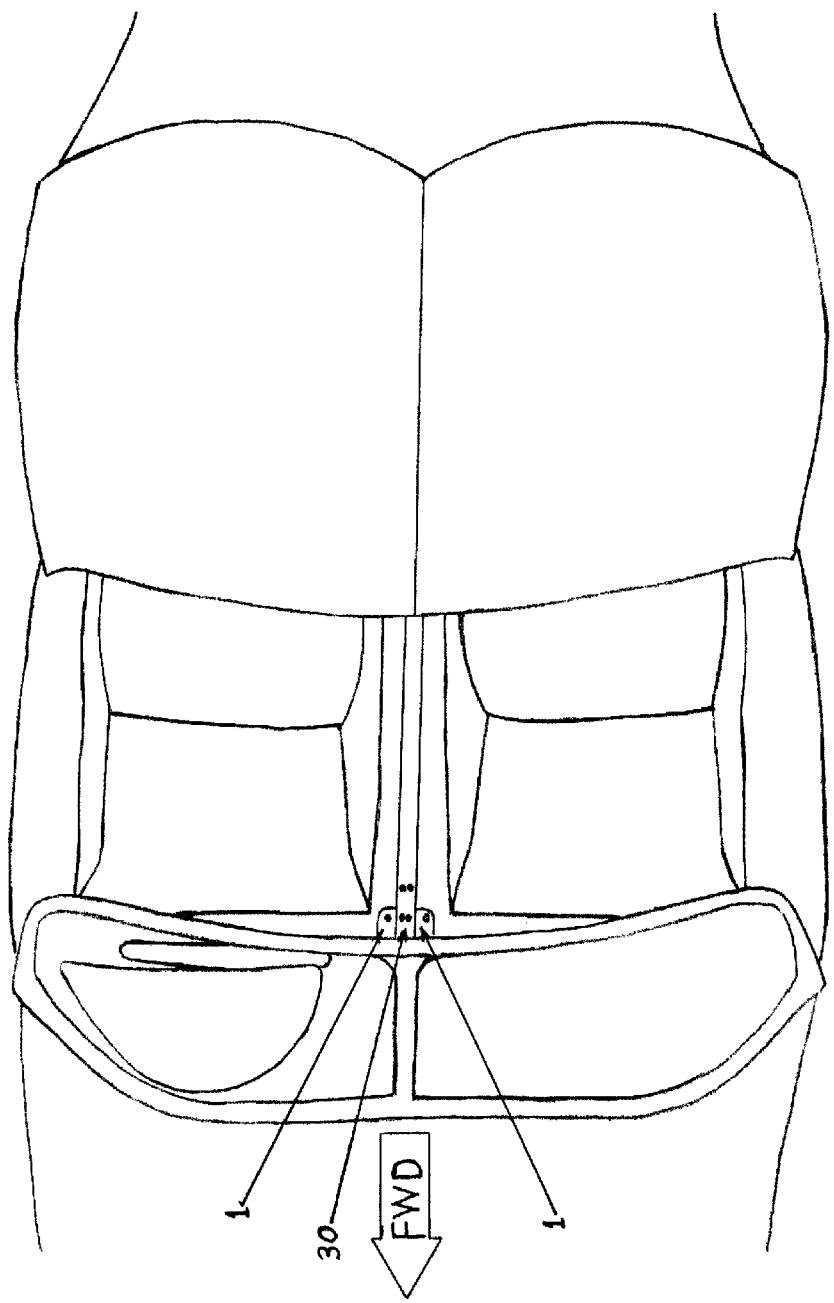
FIG. 5 is a top plan view of the present invention in the open position.
Figure 14:
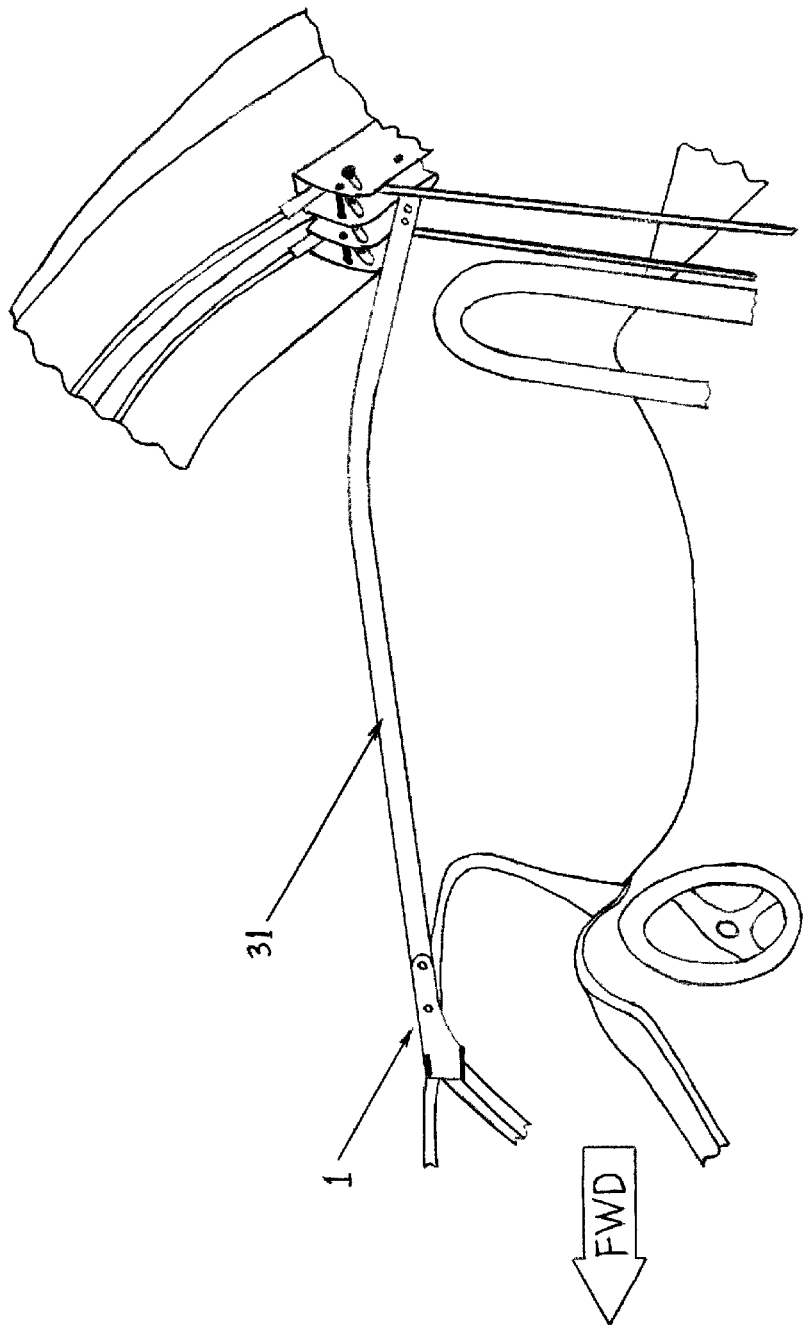
FIG. 14 is a side plan view of the center support beam with the left and right covering surfaces in the open position.

As depicted in FIGS. 5 and 14, the center support beam is positioned longitudinally at the top center of the passenger compartment. The front is connected to the windshield frame and the rear is connected to and between the left and right hinge support brackets. It provides a sealing surface for the left and right passenger compartment covering surfaces. It retains the required alignment between the windshield and left and right hinge supports. It assists in providing additional structural support for the left and right compartment covering surfaces. As depicted in FIGS. 5 and 14, attached to the forward end is an alignment pin/lock bracket (1) for the left and right compartment covering surfaces. It provides proper alignment and one of two locks for the forward edge of the left and right compartment covering surfaces.

SYSTEM OPERATION

NORMAL AND MANUAL CONTROL MODE The left and right compartment surfaces are independent and operate in an identical manor from each other. For the purpose of this instruction only the left will be discussed. The compartment surfaces are normally operated electrically by the corresponding internal operating switch. If electrical power is not available or a failure has occurred in the control system it can be manually operated by disconnecting ether end of the corresponding actuator. Movement of the mechanical linkage in the same fashion as to simulate the movement of the actuator will operate the corresponding compartment surface. Additionally, electrical actuation could be accomplished by remote control with the addition of a transmitter and receiver, not shown.

Figure 6:
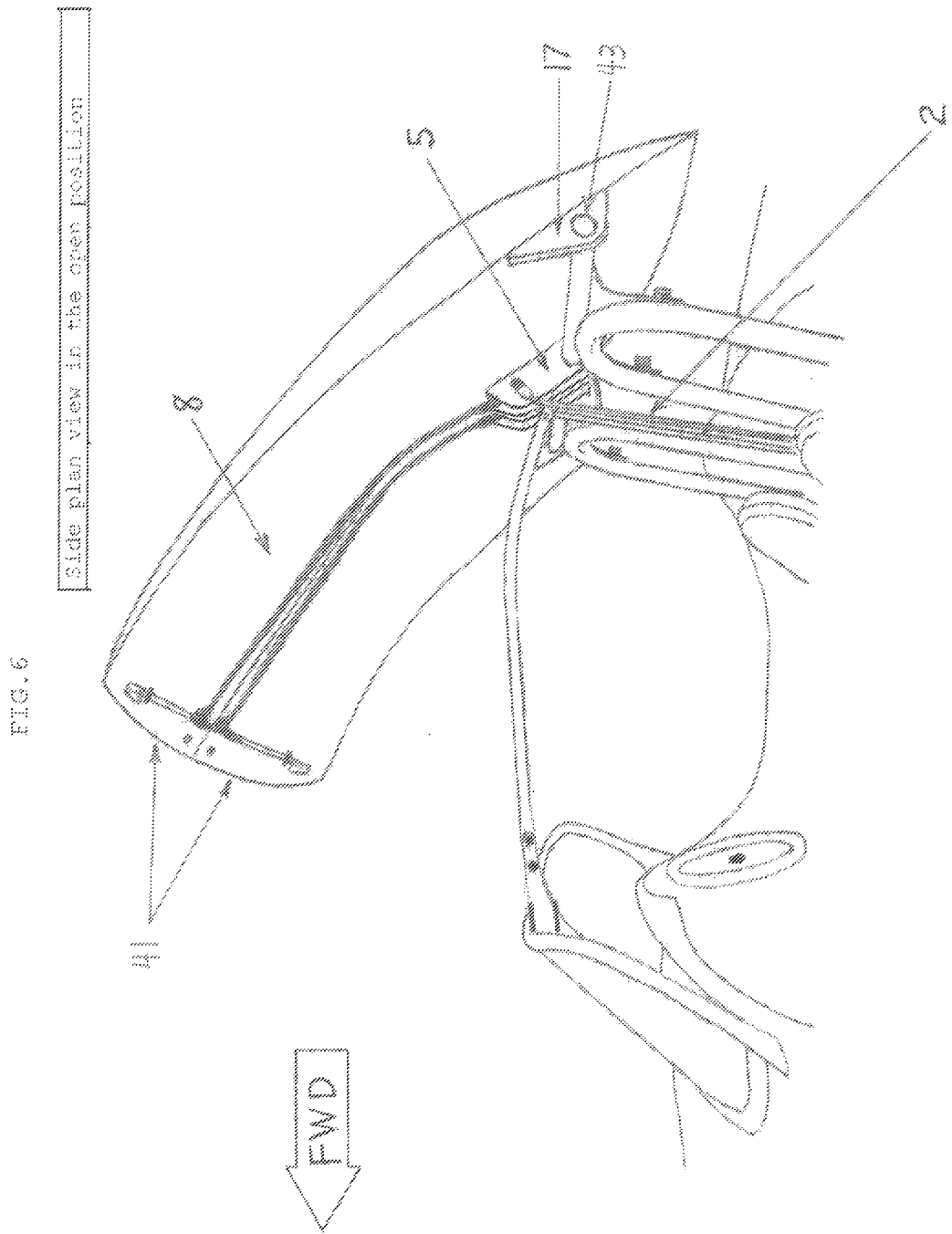
FIG. 6 is a side plan view of the present invention in the open position.
Figure 9:
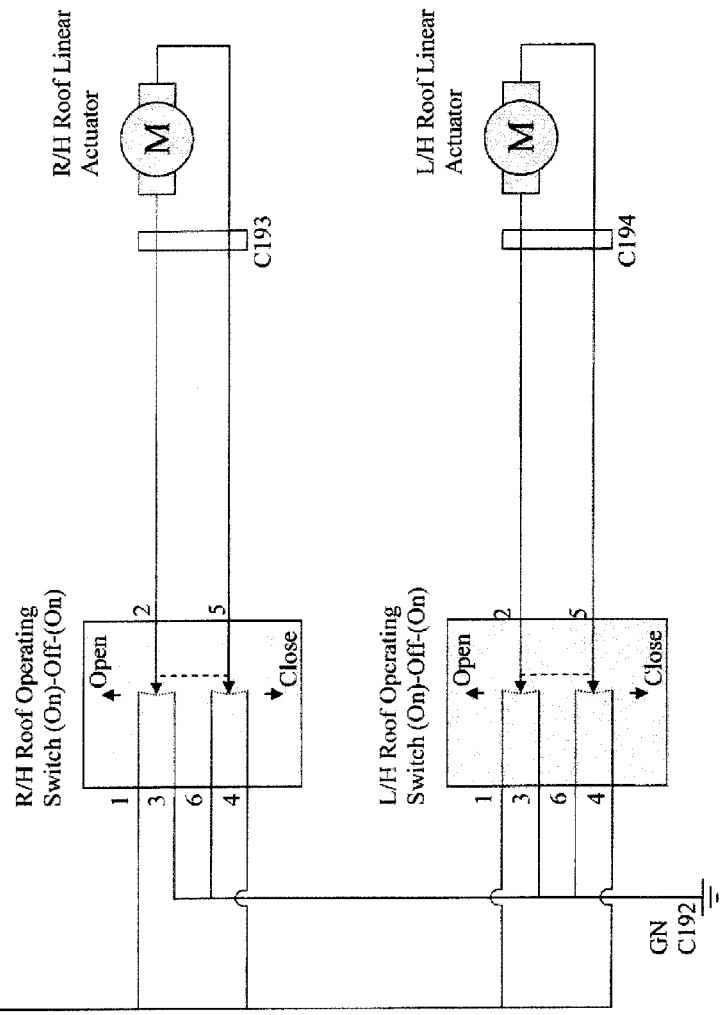
FIG. 9 is an electrical schematic of the present invention.
Figure 10:
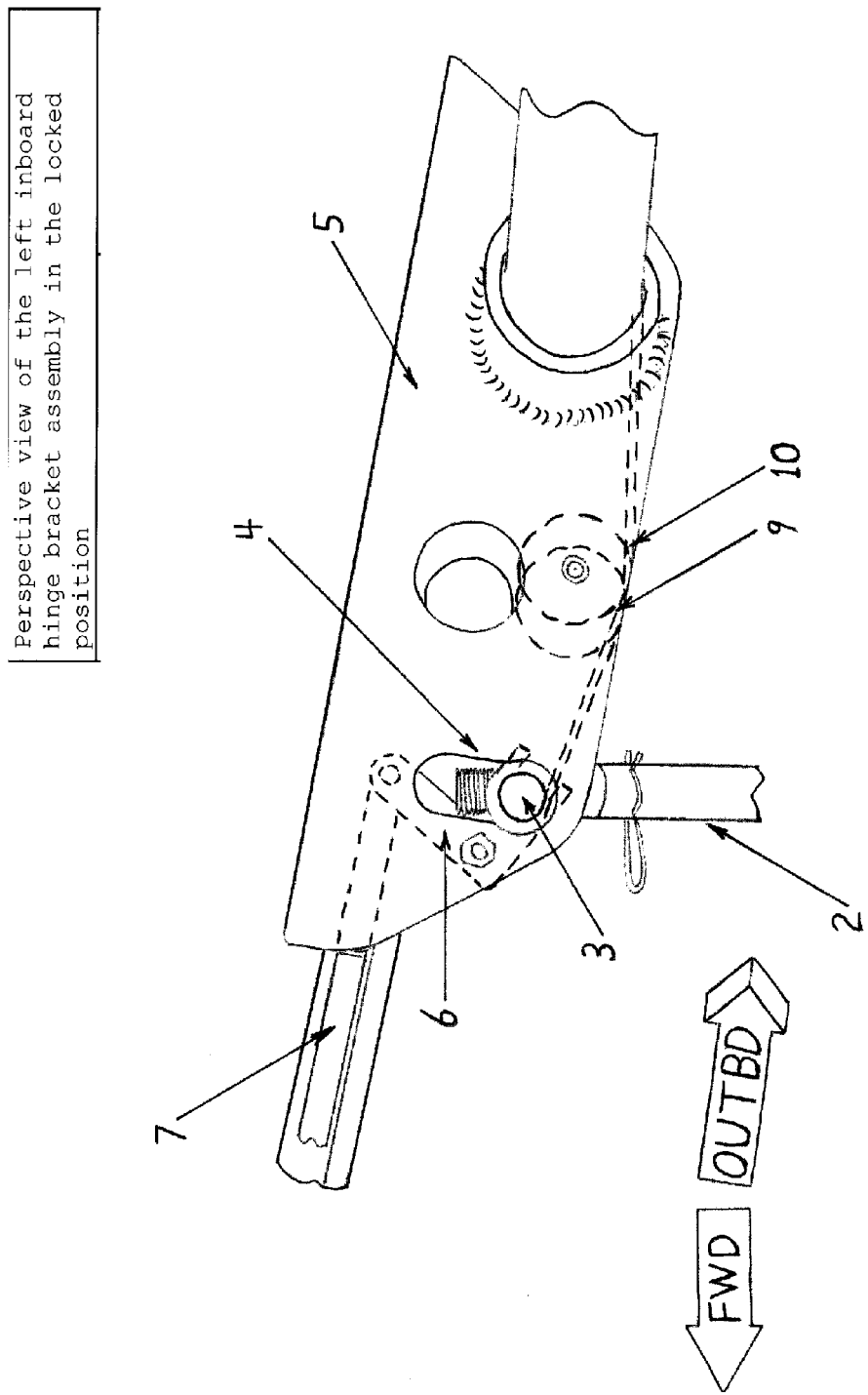
FIG. 10 is a perspective view of the left inboard hinge bracket assembly in the locked position.

COMPARTMENT SURFACE OPENING As depicted in FIG. 9, by setting and manually holding the internal electrical operating switch to OPEN, 12 VDC is directed from the motor vehicle's battery to energize the linear actuator. Electrical inputs supplied to the actuator are transformed into mechanical motion used to raise the compartment surface. The linear actuator is fixed in place at the lower end. As depicted in FIG. 10 the energized linear actuator rod end (2) will extend upward pushing up the actuating cam pin (3) from the lower end of the slot (4) to the upper end of the slot in the inboard hinge assembly (5). The movement of the actuating cam pin in the slot causes the cam lever (6) held within the inboard hinge assembly to rotate forward. The arm of the cam lever is connected to the rear end of the push-pull rod (7). As depicted in FIG. 6 the push pull rod is positioned longitudinally and mounted on the inboard inner edge of the compartment surface (8). This push-pull rod is pushed forward by the cam lever arm. The forward end of the push-pull rod is connected to the locking/unlocking mechanisms that will be discussed later.

As depicted in FIG. 10, the rotation of the compartment surface is prevented as the actuating cam pin travels through the slot by two springs (9 and 10) contained within the inboard hinge assembly. These two springs, one of which is redundant, continuously apply upward force to the actuating cam pin thus applying continuous downward force to the compartment surface forward edge via the attached inboard hinge assembly. This continuous force ensures that the locking mechanisms will be unlocked prior to the compartment surface rotating.

Figure 12:
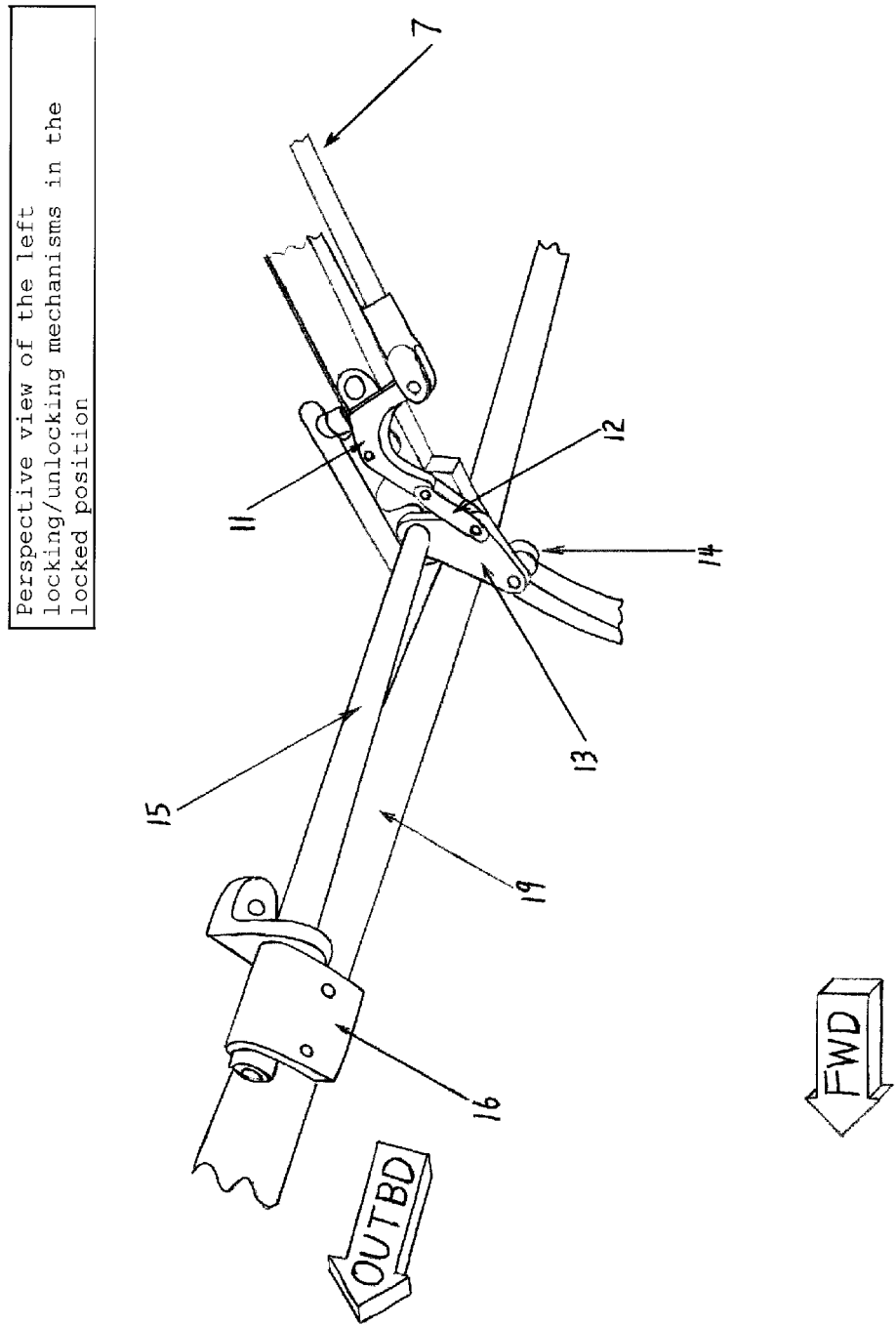
FIG. 12 is a perspective view of the left locking/unlocking mechanisms in the locked position.
Figure 13:
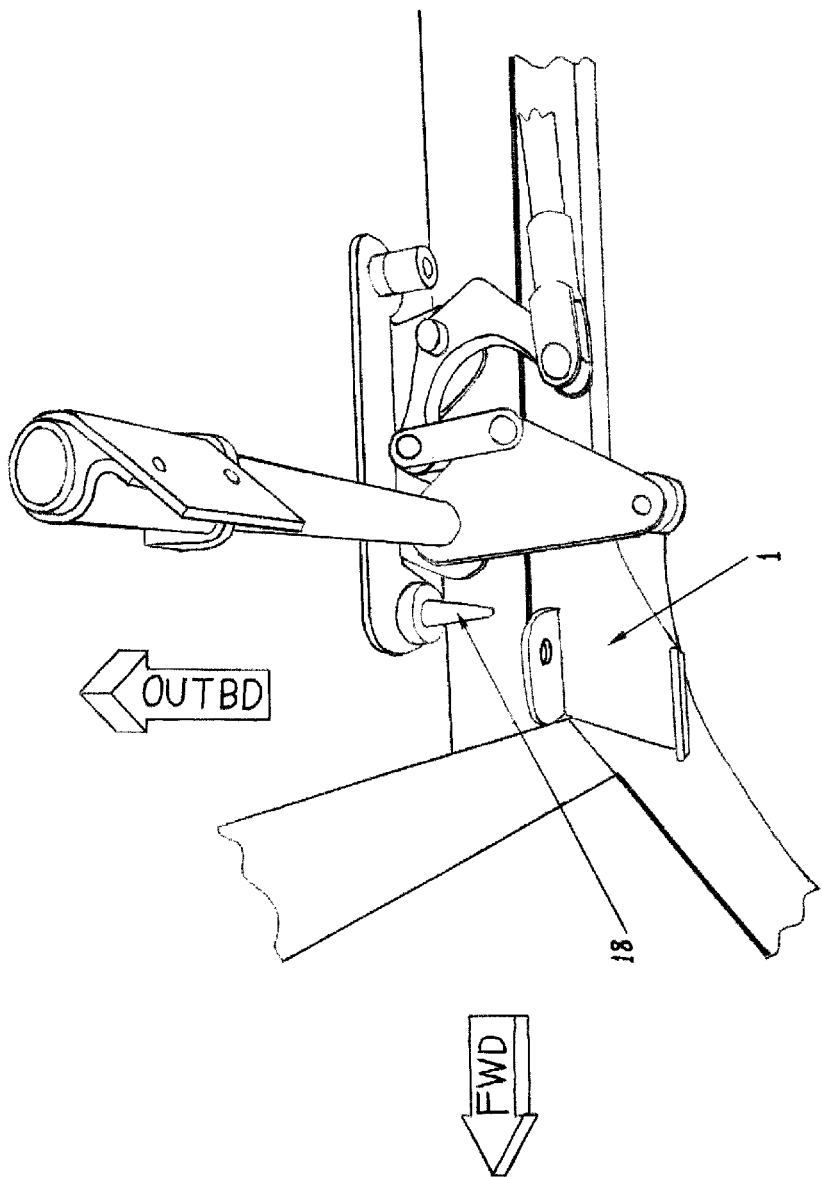
FIG. 13 is a perspective view of the left locking/unlocking mechanisms in the unlocked and partly open position.

As depicted in FIGS. 12 and 13, as the forward end of the push-pull rod (7) is pushed forward toward the unlocked position it pushes forward the arm of the secondary locking arm (11). This movement pulls the connecting links (12) causing the secondary locking arm (11), connecting links (12) and the primary locking arm (13) to be pushed out of the overcenter locked position causing the primary locking arm (13) to rotate rearward. As the primary locking arm (13) is moved rearward, the attached eccentric cam (14) is moved away from the locking tab located on the alignment pin/lock bracket (1). As depicted in FIG. 14, the alignment pin/lock bracket (1) is attached to the forward end of the center support beam. When the primary locking arm is fully rotated rearward, the eccentric cam will be unlocked from the locking tab on the alignment pin/cam bracket.

As depicted in FIG. 12, the primary locking arm rotates about a torque tube (15) which transmits the rotational force of the primary locking arm outboard to the outboard locking hook (16). The outboard locking hook is the second locking device mounted on the inside of the forward edge of the compartment surface. When in the locked position, the outboard locking hook is locked to the windshield frame. As the primary locking arm rotates rearward, it rotates the outboard locking hook via the torque tube. As depicted in FIG. 13, when the primary locking arm is fully rotated rearward, the outboard locking hook will be unlocked from the windshield frame. The compartment surface is now unlocked and ready to open.

Figure 11:
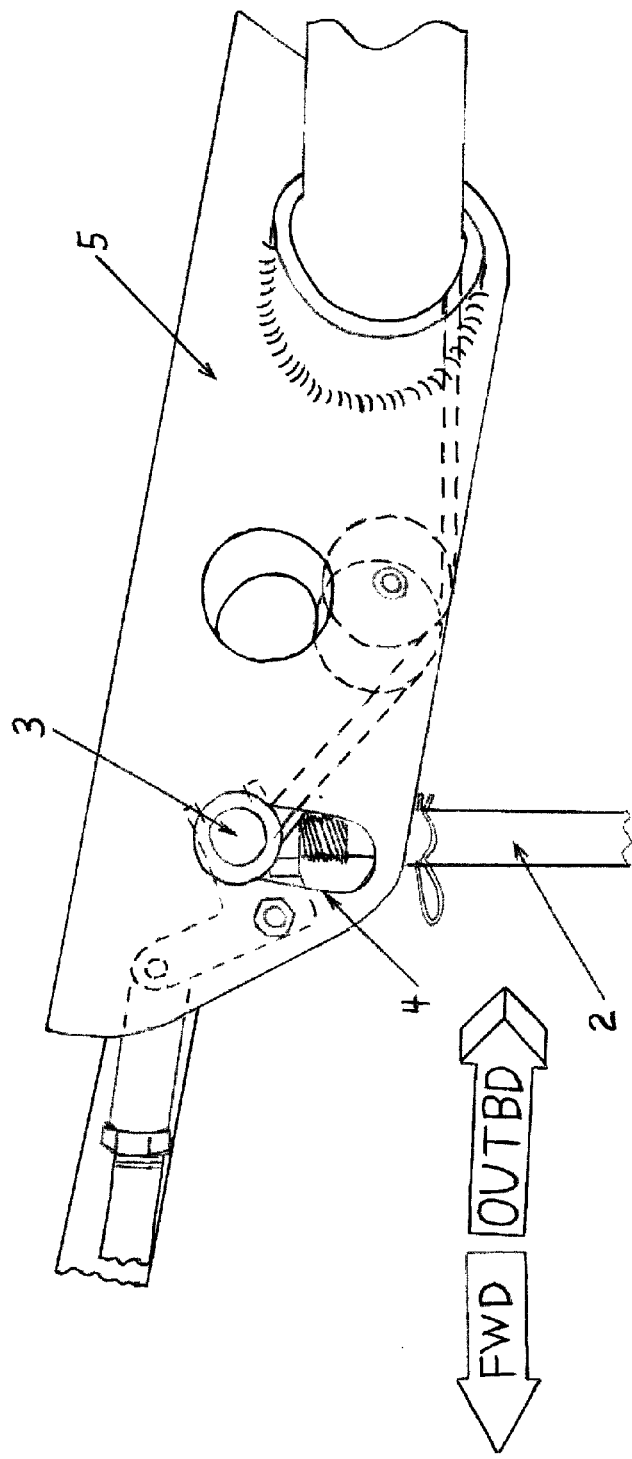
FIG. 11 is a perspective view of the left inboard hinge bracket assembly in the unlocked position.

As depicted in FIG. 11, the actuating cam pin (3) in the inboard hinge assembly has now moved to the upper end of the slot (4) causing all locking mechanisms to unlock. As depicted in FIG. 6, as the linear actuator rod end continues moving upward the actuating cam pin pushes the inboard hinge assembly (5) causing it, the outboard hinge assembly (17) and the forward edge of the attached surface to rotate up until the linear actuator internal limit switch opens when it reaches its fully extended position. The compartment surface is now fully open and the internal electrical operating switch can be released. The compartment surface is mechanically held open by the worm and reduction gears inside the linear actuator.

COMPARTMENT SURFACE CLOSING As depicted in FIG. 9, by setting and manually holding the internal electrical operating switch to CLOSE, 12 VDC is directed from the motor vehicle's battery to energize the linear actuator. Electrical inputs supplied to the actuator are transformed into mechanical motion used to lower the compartment surface. The linear actuator is fixed in place at the lower end. As depicted in FIGS. 6 and 11, as the energized linear actuator rod end (2) retracts downward, the inboard hinge assembly (5) rotates causing it, the outboard hinge assembly (17) and the forward edge of the compartment surface to lower. As depicted in FIGS. 13 and 14, when the surface is near the windshield an alignment pin (18) attached to the compartment surface is inserted into the receptacle of the alignment pin/lock bracket (1) attached the center support beam. The alignment between the forward edge of the compartment surface and windshield is retained at all times by these mated parts when the surface is closed to maintain proper locking tolerances. The compartment surface continues to close until the forward edge contacts the windshield frame.

As depicted in FIGS. 6 and 10, the actuator continues to retract overcoming the force of the two springs (9 and 10). The actuating cam pin (3) is then pulled down by the actuator from the top of the slot to the bottom of the slot (4) in the inboard hinge assembly (5). The downward movement of the actuating cam pin in the slot causes the cam lever (6) held within the inboard hinge assembly (5) to rotate rearward. The arm of the cam lever (6) is connected to the rear end of the push-pull rod (7) positioned longitudinally and mounted on the inboard inner edge of the compartment surface (8). This push-pull rod is pulled rearward by the cam lever arm. The forward end of the push-pull rod is connected to the locking/unlocking mechanisms.

As depicted in FIGS. 12 and 13, as the forward end of the push-pull rod (7) is pulled rearward toward the locked position it pulls rearward the arm of the secondary locking arm (11). This movement pushes the connecting links (12) causing the secondary locking arm (11), connecting links (12) and the primary locking arm (13) to be pulled into an overcenter locked position causing the primary locking arm (13) to rotate forward. As the primary locking arm (13) is moved forward, the attached eccentric cam (14) is moved toward the locking tab located on the alignment pin/lock bracket (1). As depicted in FIG. 14, the alignment pin/lock bracket (1) is attached to the forward end of the center support beam. When the primary locking arm is fully rotated forward, the eccentric cam will be locked under the locking tab on the alignment pin/cam bracket.

As depicted in FIG. 12, the primary locking arm (13) rotates about a torque tube (15) which transmits the rotational force of the primary locking arm outboard to the outboard locking hook (16). The outboard locking hook is the second locking device mounted on the inside of the forward edge of the compartment surface. As the primary locking arm rotates forward, it rotates the outboard locking hook via the torque tube. When the primary locking arm is fully rotated forward, the outboard locking hook will be locked to the windshield frame (19). The compartment surface is now locked.

The downward movement of the linear actuator rod end stops when the limit switch opens inside the linear actuator. The compartment surface is now closed and locked. The internal electrical operating switch can be released. The compartment surface is mechanically held closed by the worm and reduction gears inside the linear actuator. It is held in the locked position by the outboard locking hook, primary locking arm, and the overcenter locked linkage of the primary locking arm, connecting links, and the secondary locking arm.

REMOVAL The split hard top convertible is designed in such a manor as to permit its entire assembly or parts of its subassembly to be readily physically disassociated from the body of the motorized vehicle.

COMPLETE REMOVAL As depicted in FIGS. 7 and 11, individually set and manually hold the left and right internal electrical operating switches to OPEN until the left and right compartment surface is completely unlocked as indicated by the location of the left and right actuating cam pins (3) at the upper end of the slot (4) in the left and right inboard hinge assemblies (5). The forward edge of the compartment surface should be resting on the windshield frame.

Figure 1:
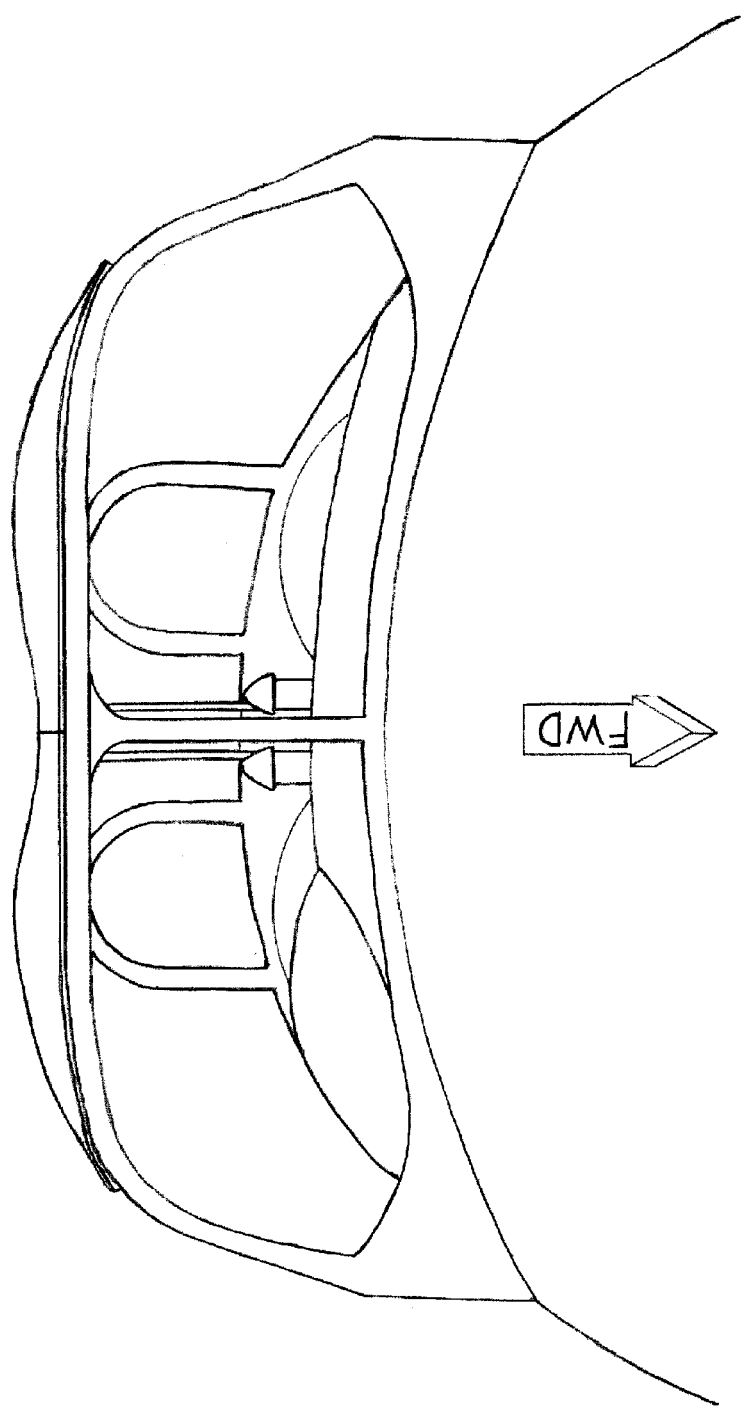
FIG. 1 is a front plan view of the present invention in the closed position.
Figure 2:
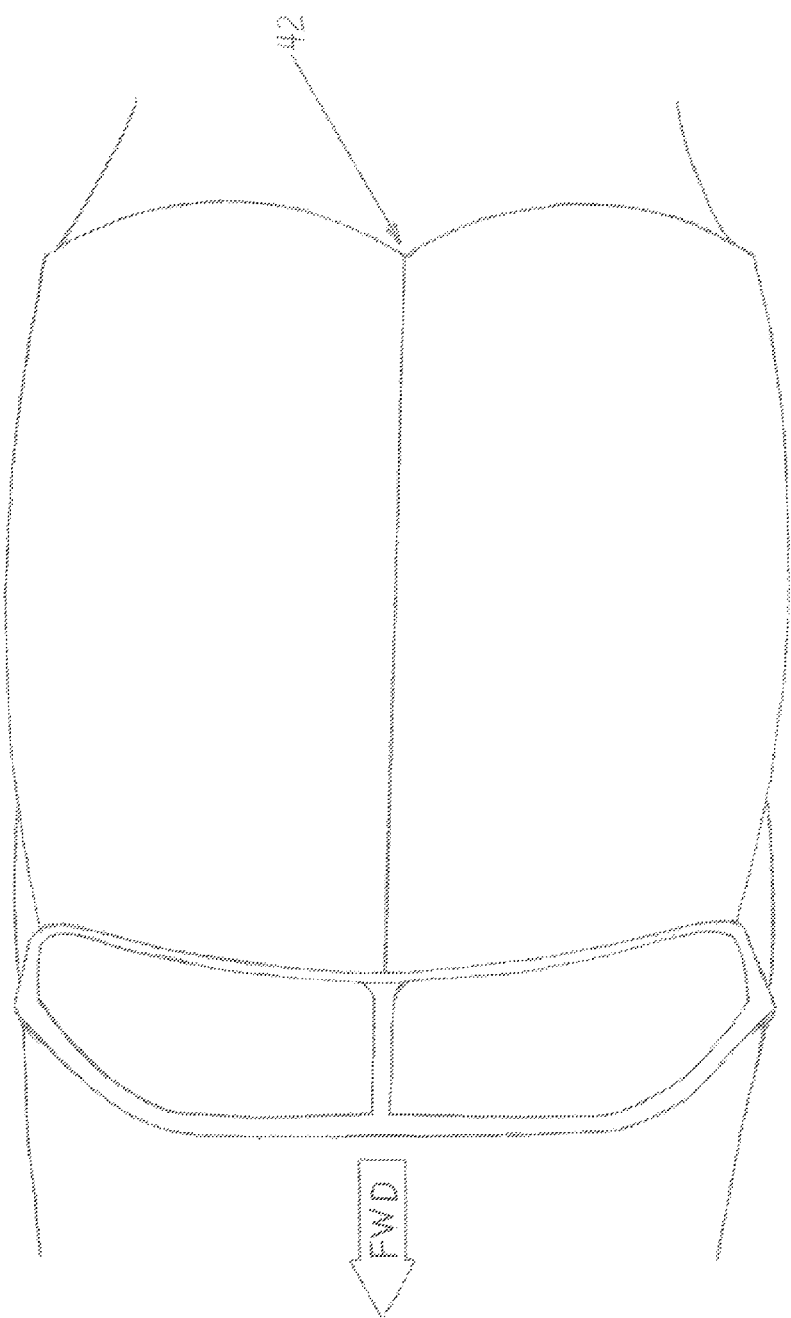
FIG. 2 is a top plan view of the present invention in the closed position.
Figure 3:
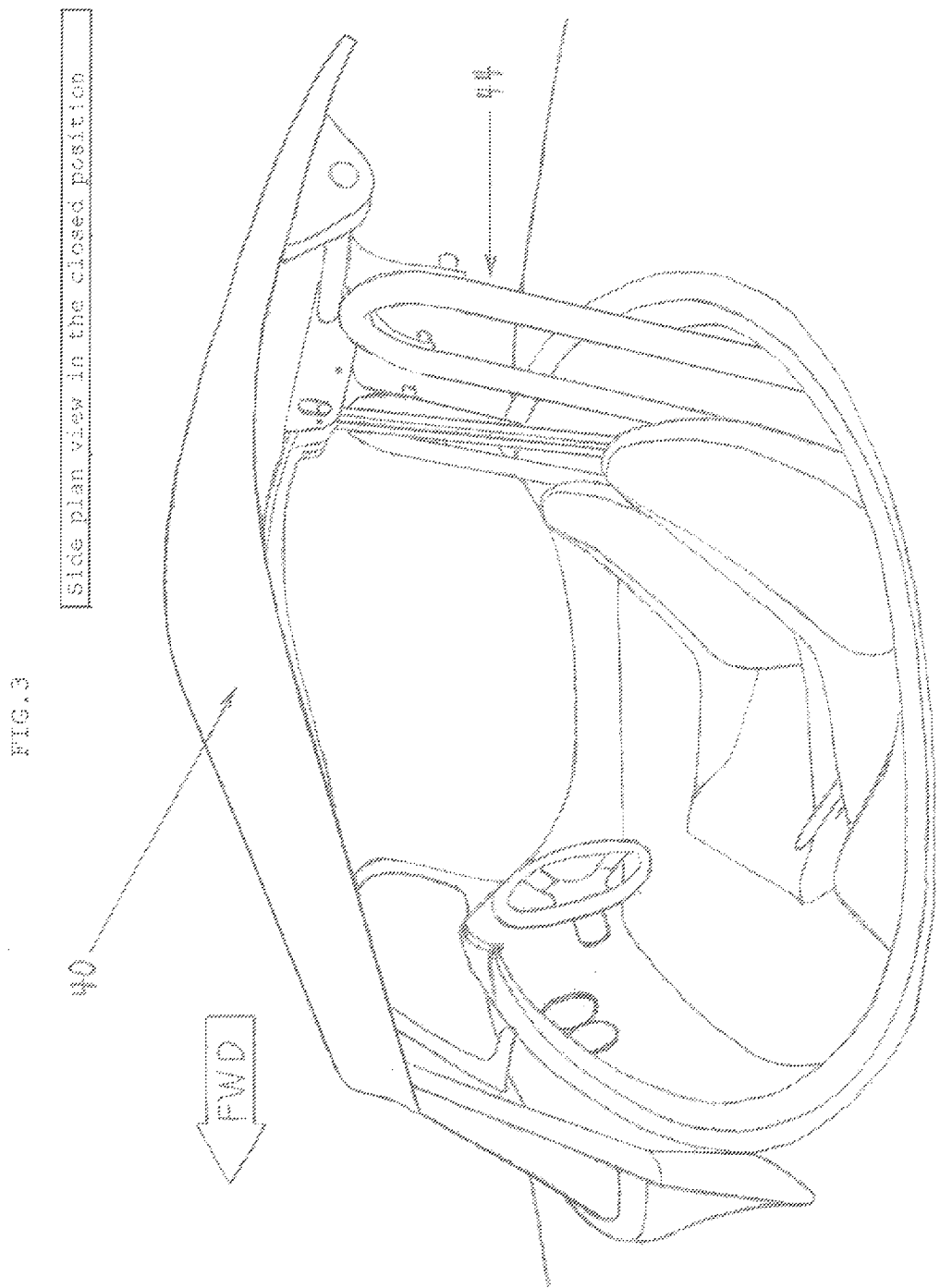
FIG. 3 is a side plan view of the present invention in the closed position.
Figure 4:
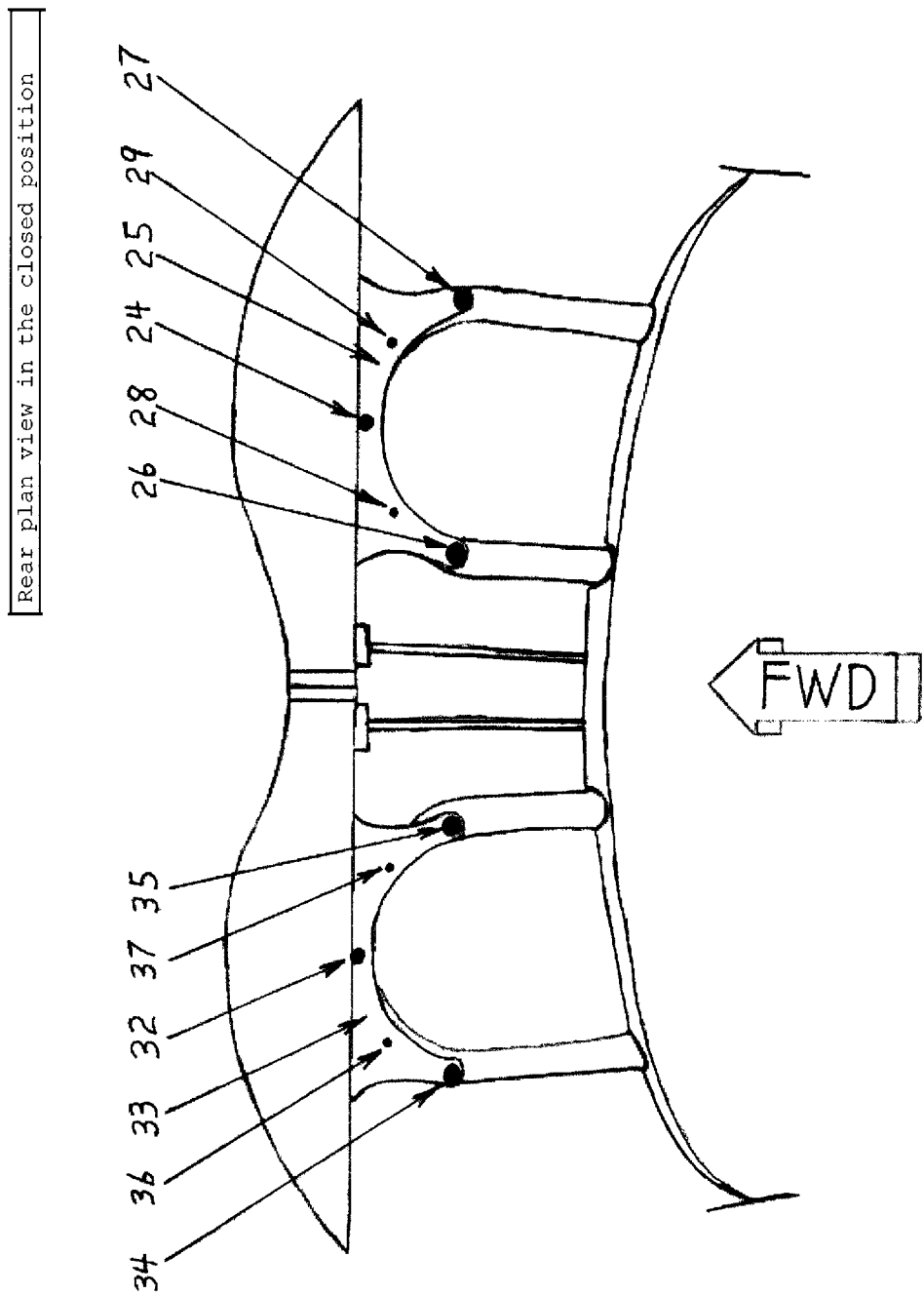
FIG. 4 is a rear plan view of the present invention in the closed position.

As depicted in FIG. 8, remove the quick release retaining clips (20 and 21) at the top of the left and right actuator rods (22 and 23). As depicted in FIG. 4, remove the bolt (24) from the center of the right hinge support bracket (25). Next, loosen, but do not remove, the two bolts (26 and 27) on the inboard and outboard sides of the right hinge support bracket. Manually rotate the forward edge of the right compartment surface upward about six inches until the right actuator rod end separates from the actuating cam pin. While supporting the weight of the right compartment surface, remove by hand the two bolts (26 and 27) on the hinge support bracket. Slide rearward the hinge support bracket off the alignment pins (28 and 29) then slide outboard the compartment surface until it separates from the center support beam. Remove the right compartment surface.

As depicted in FIGS. 5 and 14, remove the four bolts (30) from the forward end of the center support beam (31). To gain access to the left two bolts, manually rotate and hold the forward edge of the left compartment surface upward about six inches until the left actuator rod end separates from the actuating cam pin. Remove the left two bolts. As depicted in FIGS. 13 and 14, raise the left compartment surface until the alignment pin (18) on the compartment surface is disengaged from receptacle on the alignment pin/lock bracket (1) located on the center support beam (31). Slide the rear end of the center support beam to the right until it disconnects from the left hinge support bracket. Remove the center support beam.

As indicated in FIG. 4, remove the bolt (32) from the center of the left hinge support bracket (33). Next, loosen, but do not remove, the two bolts (34 and 35) on the inboard and outboard sides of the left hinge support bracket. While supporting the weight of the left compartment surface, remove by hand the two bolts (34 and 35) on the hinge support bracket. Slide rearward the hinge support bracket off the alignment pins (36 and 37). Remove the left compartment surface.

As depicted in FIG. 8, disconnect the electrical connections for the left and right actuators. Remove the quick disconnect pins (38 and 39) from the lower end of the actuators. Remove the left and right actuators. The split hard top convertible has now been completely removed from the motor vehicle. Installation is in reverse order.

REMOVAL OF ONE SIDE ONLY Each compartment surface is fully independent from the other and can be removed from the motor vehicle without effecting the operation and function of the other. The occupant(s) can remove one compartment surface and its corresponding actuator while retaining the center support beam thus giving the occupant(s) more flexibility than can be achieved from a conventional hard top or convertible.

ONE PIECE ONLY COMPARTMENT SURFACE The split hard top could be made in a single piece, not shown, thus reducing parts, complexity and cost, but loosing some flexibility and functionality.

WINDOW CONFIGURATIONS Side and rear windows, not shown, can be omitted or installed in any number of current design configurations to secure the occupant's compartment to the split hard top.

Although the invention has been described in connection with a preferred embodiment, it should be understood that various modifications, additions and alterations may be made to the invention by one skilled in the art without departing from the spirit and scope of the invention as defined herein.

The invention claimed is:

1. In a motorized vehicle passenger compartment upper covering FIG. 3(40), consisting of a two part moveable upper exterior surface FIG. 6(41), electrically actuated FIG. 9, wherein the surface is equally bisected longitudinally FIG. 2(42), has a left and right rigid surface, each capable of independently assuming a plurality of positions relative to the body of the vehicle, whereby the rigid upper covering pivots laterally FIG. 6(43) at or near the surfaces rear edge behind the occupant(s) riding position and is connected to the vehicle's means associated with the cab to prevent injury to the occupants from rollover or crush protection or similar device in the same vicinity FIG. 3(44), constructed and arranged such that the forward edge opens FIG. 6, closes FIG. 3, locks FIG. 12 and unlocks FIG. 13 to the windshield frame FIG. 12(19) and center support beam FIG. 14(31); wherein the center support beam is fixed longitudinally at the top center of the passenger compartment interconnecting the windshield frame and the vehicle's means associated with the cab to prevent injury to the occupants from rollover or crush protection or similar device in the same vicinity.

2. A motorized vehicle passenger compartment upper covering recited in claim 1 wherein said upper covering surface is constructed and arranged as to permit its entire assembly or parts of its subassembly to be readily physically disassociated from the body of the motorized vehicle so as to maintain the functionality of the vehicle when said covering is partly removed by removing the bolts FIG. 4(32,34,35), pins FIG. 8(21,39) and electrical connector FIG. 9(C193) or bolts FIG. 4(24,26,27), pins FIG. 8(20,38) and electrical connector FIG. 9(C194) or fully removed by removing the bolts FIG. 4(24, 26,27,32,34,35)FIG. 5(30), pins FIG. 8(20,21,38,39) and electrical connectors FIG. 9(C193, C194).

3. A motorized vehicle passenger compartment upper covering recited in claim 1 wherein said moveable upper covering surface is constructed such that it does not require a separate substructure for structural integrity FIG. 6.

4. A motorized vehicle passenger compartment upper covering recited in claim 1 wherein actuation to unlock and open or close and lock a single exterior surface is achieved by the use of a single source of continuous linear mechanical motion FIG. 8(22 or 23) through the use of a cam pin FIG. 10(3) and cam lever FIG. 10(6) positioned inside the upper exterior surface inboard hinge FIG. 10(5) whereby the cam lever is connected to locking and unlocking mechanisms outside the hinge FIG. 12(7,11,12,13,14,15,16).

5. A motorized vehicle passenger compartment upper covering recited in claim 4 wherein said linear mechanical motion is connected to a cam pin FIG. 10 (3) contained in the upper exterior surface hinge FIG. 10(5) between the fulcrum and the windshield wherein linear motion causes the cam pin to travel through a slot FIG. 10(4) which rotates a cam lever FIG. 10 (6) which in turn controls, through mechanical linkage outside the hinge FIG. 10(7), the locking and unlocking function of the upper exterior surface while the cam pin positioned at the end of the slot acts upon the hinge as it continues to be driven by the linear mechanical motion FIG. 10 (2) to control the position of the upper exterior surface relative to the body of the vehicle; moreover, contained within the hinge are two springs FIG. 10(9,10) which apply upward force to the cam pin and downward force to the hinge to ensure that the locking mechanisms will be unlocked prior to the compartment surface rotating.

* * * * *